(12) United States Patent
Spooner

(10) Patent No.: US 9,822,758 B2
(45) Date of Patent: Nov. 21, 2017

(54) HYDROELECTRIC TURBINE COIL ARRANGEMENT

(75) Inventor: Edward Spooner, Bishop Auckland (GB)

(73) Assignee: Openhydro IP Limited (IE)

( * ) Notice: Subject to any disclaimer, the term of this patent is extended or adjusted under 35 U.S.C. 154(b) by 0 days.

(21) Appl. No.: 14/238,135

(22) PCT Filed: Aug. 8, 2012

(86) PCT No.: PCT/EP2012/065520
§ 371 (c)(1),
(2), (4) Date: May 9, 2014

(87) PCT Pub. No.: WO2013/021006
PCT Pub. Date: Feb. 14, 2013

(65) Prior Publication Data
US 2014/0232117 A1    Aug. 21, 2014

(30) Foreign Application Priority Data

Aug. 10, 2011  (EP) .................................... 11177068

(51) Int. Cl.
*F03B 17/06*  (2006.01)
*F03B 13/26*  (2006.01)
(Continued)

(52) U.S. Cl.
CPC ............ *F03B 17/06* (2013.01); *F03B 13/264* (2013.01); *H02K 3/28* (2013.01); *H02K 7/1823* (2013.01);
(Continued)

(58) Field of Classification Search
CPC ......... F03B 13/264; F03B 17/06; H02K 3/28; H02K 7/1823; H02K 41/06
See application file for complete search history.

(56) References Cited

U.S. PATENT DOCUMENTS 2,484,840 A * 10/1949 Liwschitz .............. H02K 23/02
                                                    322/64
2,579,865 A * 12/1951 Roters ............................ 310/82
(Continued)

FOREIGN PATENT DOCUMENTS

DK  WO 2010031651 A2 *  3/2010  ............. H02P 9/007
EP         2 088 311 A1      8/2009
(Continued)

OTHER PUBLICATIONS

International Search Report for corresponding PCT/EP2012/065520, completed Sep. 10, 2012.

*Primary Examiner* — Viet Nguyen
(74) *Attorney, Agent, or Firm* — Tarolli, Sundheim, Covell & Tummino LLP

(57) ABSTRACT

The present invention provides a hydroelectric turbine for generating electricity by extracting power from the tidal flow of water through the turbine, the turbine comprising a shaftless rotor which results in the eccentric rotation of the rotor relative to the stator, which can result in uneven generation of power through differences in the spacing between rim mounted magnets and coils forming a generator of the turbine, the turbine thus employing groupings of equally spaced and serially connected coils.

6 Claims, 5 Drawing Sheets

(51) Int. Cl.
*H02K 3/28* (2006.01)
*H02K 7/18* (2006.01)
*H02K 41/06* (2006.01)

(52) U.S. Cl.
CPC ....... *F05B 2240/60* (2013.01); *F05B 2250/42* (2013.01); *F05B 2260/85* (2013.01); *H02K 41/06* (2013.01); *Y02E 10/28* (2013.01)

(56) References Cited

U.S. PATENT DOCUMENTS

| | | | | |
|---|---|---|---|---|
| 5,545,943 | A * | 8/1996 | Satake | H02K 41/06 310/350 |
| 5,677,583 | A * | 10/1997 | Kawai | H02K 41/06 310/156.46 |
| 8,308,422 | B2 * | 11/2012 | Williams | 415/7 |
| 2008/0007070 | A1 | 1/2008 | Edelson | |
| 2008/0007130 | A1 * | 1/2008 | Edelson | H02K 41/06 310/82 |
| 2009/0058214 | A1 * | 3/2009 | Mizushima | H02K 7/116 310/203 |
| 2010/0026002 | A1 * | 2/2010 | Spooner | 290/54 |
| 2011/0110770 | A1 * | 5/2011 | Spooner et al. | 415/173.1 |
| 2011/0210552 | A1 * | 9/2011 | Birkemose | H02P 9/007 290/44 |
| 2012/0027522 | A1 * | 2/2012 | Ives et al. | 405/184.4 |
| 2012/0175877 | A1 * | 7/2012 | Ives et al. | 290/42 |
| 2014/0321973 | A1 * | 10/2014 | Ives et al. | 415/1 |

FOREIGN PATENT DOCUMENTS

| | | |
|---|---|---|
| GB | 2 182 464 A | 5/1987 |
| WO | WO 03/012292 A1 | 2/2003 |
| WO | WO 2008/014584 A1 | 2/2008 |
| WO | WO 2008/141662 A1 | 11/2008 |
| WO | WO 2009098057 A1 * | 8/2009 |

* cited by examiner

HYDROELECTRIC TURBINE COIL ARRANGEMENT

RELATED APPLICATIONS

The present invention application is a U.S. National Phase Patent which claims priority from PCT Application Serial No. PCT/EP2012/065520, filed 8 Aug. 2012, which claims priority from EP 11177068.1, filed 10 Aug. 2011, both of which are incorporated herein in their entirety.

FIELD OF THE INVENTION

The present invention relates to a hydroelectric turbine coil arrangement, and in particular an arrangement of the coils forming part of a generator of the hydroelectric turbine, which arrangement improves the performance of the generator.

BACKGROUND OF THE INVENTION

This invention relates generally to the field of hydroelectric turbines that produce electricity by harnessing the flow of water, and more particularly relates to such devices wherein the tidal flow of water causes rotation of a large impellor-type rotor having an annular outer rim disposed within a large annular housing.

While most turbines are constructed to have a central rotating shaft onto which the blades or runners are mounted, it is also known to produce open-centered turbines, also known as rim-mounted turbines. Turbines having open-centered rotors, where the blades are mounted between inner and outer annular rings or rims and where the energy is transferred through the outer rim to an annular housing that retains the rotor, can be particularly successful in low head conditions, i.e., in slower currents.

Examples of open center, rim-mounted turbines can be seen in U.S. Pat. No. 5,592,816 issued Jan. 14, 1997, and reissued as RE38,336 on Dec. 2, 2003, U.S. Pat. No. 6,648,589 issued Nov. 18, 2003, U.S. Pat. No. 6,729,840 issued May 4, 2004, and U.S. Patent Appl. Publication US2005/0031442 published Feb. 10, 2005 (Ser. No. 10/633,865). Examples of hydroelectric turbines used in low head (tidal flow) conditions can be seen in U.S. Pat. No. 4,421,990 to Heuss et al., U.S. Pat. Nos. 6,168,373 and 6,406,251 to Vauthier, UK Patent Appl. No. GB 2,408,294 to Susman et al., and WIPO International Publication WO 03/025385 to Davis et al.

Tidal powered turbines are seen as environmentally safe replacements for electrical power plants that utilize fossil fuels or atomic energy. In harnessing water to produce electricity on a large scale capable of powering industrial complexes, towns, cities, etc., it is necessary to provide large numbers of turbines, and it is necessary that the turbines be as large as practical in order to maximize the amount of electricity produced by each turbine. The rotor blades of these turbines are multiple meters in length, with some experimental designs having blades exceeding 50 meters in length.

As the length of the rotor blades is increased, structural and manufacturing challenges are presented that are not encountered in smaller turbines or generators. For shaft-mounted turbines, it is difficult to provide long blades that are both strong and light. In one solution, the blades of the shaft-mounted turbine are provided with an outer annular rim, which is contained within an annular housing, thereby providing support to the blades through the shaft and the rim. Alternatively, rim-mounted turbines with no central shaft provide a solution to this problem by providing annular support to the inner and outer ends of the blade, with the outer support rim being retained within a housing having an annular slot or channel. In a typical means for generation of electrical power, a large number of magnets are spaced along the annular support rim and a large number of coils are spaced along the receiving channel in the stator housing. The magnetic field established by the rotor field system passes across the gap that separates the rotor and the stator. Rotation of the rotor causes the magnetic flux linkage with the coils to change, inducing an electro-magnetic force in the coils.

In order to reduce the start up torque of such open centre turbines, and often due to manufacturing tolerances, such turbines are normally produced with the annular slot or channel in the stator being greater in diameter than the rotor. This results in the rotor effectively having a floating axis of rotation, meaning that the rotor is not fixed concentrically within the stator, and can undergo a degree of movement, float, and/or eccentric rotation within the stator. Furthermore, the axial thrust bearings have a clearance allowing the rotor to move axially and for its plane of rotation to depart from being parallel to the plane of the stator so that the rotor motion may contain precession elements and other complex patterns. This eccentric rotation can however lead to unbalance in the voltage generated in the coils, with the coils on the stator that are in closer proximity to the magnets on the rotor, due to the eccentricity of the rotor, generating a disproportionate amount of EMF.

When a number of such coils are connected together in parallel, their differing induced EMFs result in the coils carrying different current and the coils do not share the electrical load equally. A small displacement of the rotor from the concentric position can lead to a disproportionately large inequality in the distribution of load. This can leave the coils susceptible to overheating and to reduced efficiency of power conversion.

It is therefore an object of the present invention to overcome the above mentioned problem without recourse to the difficult and expensive solution of using high-tolerance, closely-fitting bearings to support the rotor in a concentric co-planar position within the stator.

SUMMARY OF THE INVENTION

According to the present invention there is provided a hydroelectric turbine comprising a stator; a shaftless rotor housed for rotation within the stator, the stator defining an opening within which the rotor is constrained, the opening being shaped and dimensioned, relative to the rotor, to provide the rotor with a floating axis of rotation; an array of magnets on the rotor; and a corresponding array of coils on the stator; characterised in that the coils are arranged in groups within which the coils are circumferentially equally spaced from one another and are electrically connected together in series.

Preferably, the coils electrically connected together in series are not physically adjacent one another on the stator.

Preferably, the rotor comprises an open centre.

Preferably, the opening is shaped and dimensioned to permit the rotor to undergo substantially eccentric or hypo-cycloidal motion.

Preferably, the hydroelectric turbine comprises a set of bearings supporting the rotor within the stator, the bearings comprising an array of bearing units on one or other of the stator and rotor and a corresponding journal on the other of the stator and rotor.

Preferably, the stator comprises an annular channel which defines the opening and within which the rotor in retained for rotation.

As used herein, the term "floating axis" is intended to mean a rotational axis of a body such as a hydroelectric turbine rotor, which axis is not fixed in position and is free to undergo a degree of movement or translation in directions substantially orthogonal to the rotational axis, in particular while the rotor is undergoing rotation about the axis. As a result the rotor may describe a complex pattern of rotation about its axis combined with random or orbital motion of the axis within a prescribed space. The trajectory of the rotor may be classified as hypocycloidal or random and may also have components in the axial direction and precession of the axis.

DETAILED DESCRIPTION OF THE DRAWINGS

Figure 1:
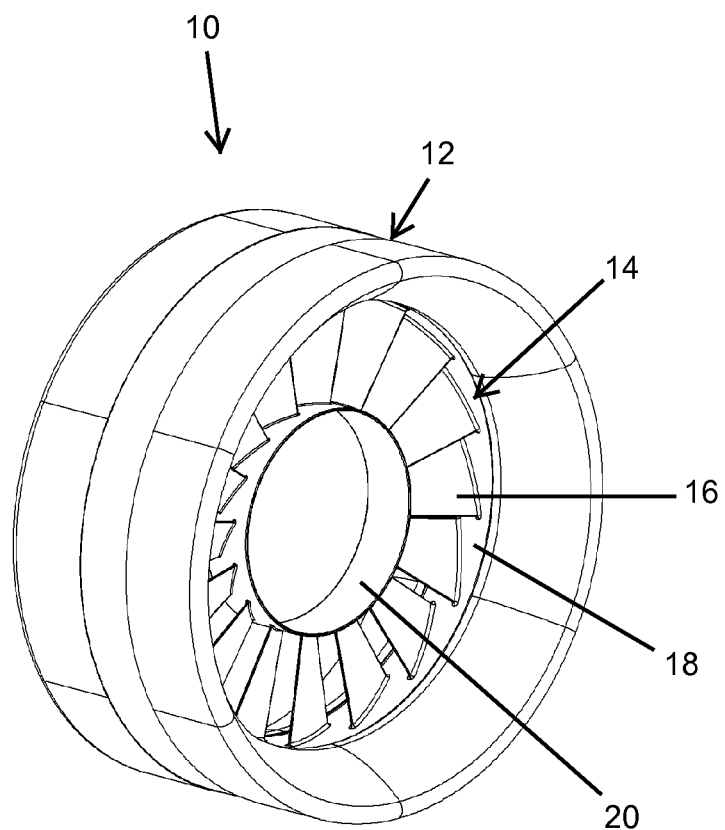
FIG. 1 illustrates a perspective view of a hydroelectric turbine according to an embodiment of the present invention.

Referring now to the accompanying drawings there is illustrated a hydroelectric turbine, generally indicated as 10, which is adapted to be mounted on the seabed or the like, preferably via a suitable base which may be secured in position on the seabed.

The turbine 10 comprises an outer stator 12 within which is mounted for rotation a rotor 14. The rotor 14 comprises a circular array of radially extending blades 16 which are retained between an outer rim 18 and an inner rim 20. The outer rim 18, in the embodiment illustrated, is constrained within an annular channel (not shown) formed on an inner surface of the stator 12. It can be seen that the turbine 10 does not include a central shaft on which the rotor 14 would, in a conventional turbine, be mounted for rotation, and thus the turbine 10 is an open centred or shaftless turbine 10. Suitable bearings (not shown), for example in the form of journals and bearing plates, are positioned on the outer rim 18 and the stator 12. In addition, the electrical components of the turbine 10 are located in opposition to one another about the outer rim 18 and the stator 12, thus commonly referred to as a "rim mounted generator".

These electrical components are comprised of an array of magnets 22 mounted about the outer rim 18 and a corresponding array of coils 24 mounted about the opposed face of the stator 12, the magnets 22 and coils 24 being separated from one another by a small gap 26 between the stator 12 and rotor 14. It will of course be understood that the positions of the magnets 22 and coils 24 could be reversed. However, the arrangement with magnets on the stator and coils on the rotor suffers from the drawback that some arrangement is required for collecting current from the rotor and so the arrangement with magnets on the rotor and coils on the stator would usually be preferred.

Due to the shaftless nature of the turbine 10, and as detailed above, the rotor 14 is capable of a degree of movement within the annular channel defined by the stator 12 and is therefore capable of undergoing eccentric rotation relative to the centre of the stator 12. As a result, and as shown in exaggerated representation in FIG. 2, the rotor 14 will often be positioned within the stator 12 such that a portion of the rotor 14, and therefore a section of the magnets 22, will be closer to the stator 12 than the opposed part of the rotor 14. This will thus result in uneven generation of electromotive force between the coils 24, with those coils 24 in closer proximity to the magnets 22 inducing a disproportionately high EMF. This may result in overheating of those coils 24, possibly causing damage thereto, and this must normally be taken into consideration when designing the turbine 10, and in particular the coils 24.

Figure 4:
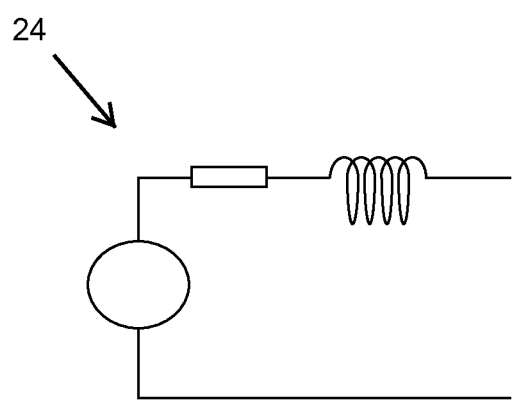
FIG. 4 illustrates a circuit diagram representing an equivalent electric circuit for one of the coils illustrated in FIGS. 1 and 2.

As illustrated in FIG. 4, each coil 24 may be represented in an equivalent electric circuit by an AC voltage source in series with an inductor element and a resistor representing the induced EMF, the armature reaction and the coil resistance. The inductances and resistance do not differ significantly between coils but the voltage sources will differ if the rotor is not concentric.

The induced EMF in each coil 24 is an alternating voltage that can be described by its amplitude, frequency and its phase with respect to the EMF induced in one particular coil selected as a reference. If two or more coils are connected in parallel to deliver current to a common output then the two coils should have voltage sources of equal amplitude, frequency and phase. Equality of frequency is assured by the machine construction. The amplitudes may be unequal for the reasons described. The voltage sources will be in phase if the coils are separated by an integral number of magnet pole pitches.

The current flowing in a coil 24 is equal to the difference between its voltage source and the voltage of the circuit to which it is connected, divided by the impedance of the coil. Thus for example if two coils having voltages of 11V and impedance of 1 Ohm are connected in parallel to a load circuit at a voltage of 10V, then each delivers 1 A to the load. If, however, the voltages are slightly modified by eccentric rotation of the rotor by just 0.5V to become 10.5 and 11.5V then they carry 0.5 A and 1.5 A respectively. The heating effect in each coil is proportional to the square of the current and so the heating effect which is ideally 1 W in each coil becomes 2.25 W and 0.25 W a ratio of 9:1 so for a small deviation from equality of voltage a disproportionately large inequality in current results together with an even greater inequality in loss and its attendant heating effect. The total loss increases also.

If the two coils 24 differ in phase then similar differences in current can arise. Eccentric rotation of the rotor can produce phase differences between coils that are correctly spaced as illustrated by FIG. 5.

If the rotor position is eccentric with its axis permanently displaced in one direction then some stator coils will be permanently subjected to a higher EMF and others to a lower EMF. The result may appear as overheating of the stator generally in one region covering an arc of the perimeter. If the rotor describes a more complex motion, the region of coils carrying higher current may rotate with the rotor and no single region would be heated more than the others but the total loss would be higher than if the rotor were turning perfectly concentrically.

Figure 2:
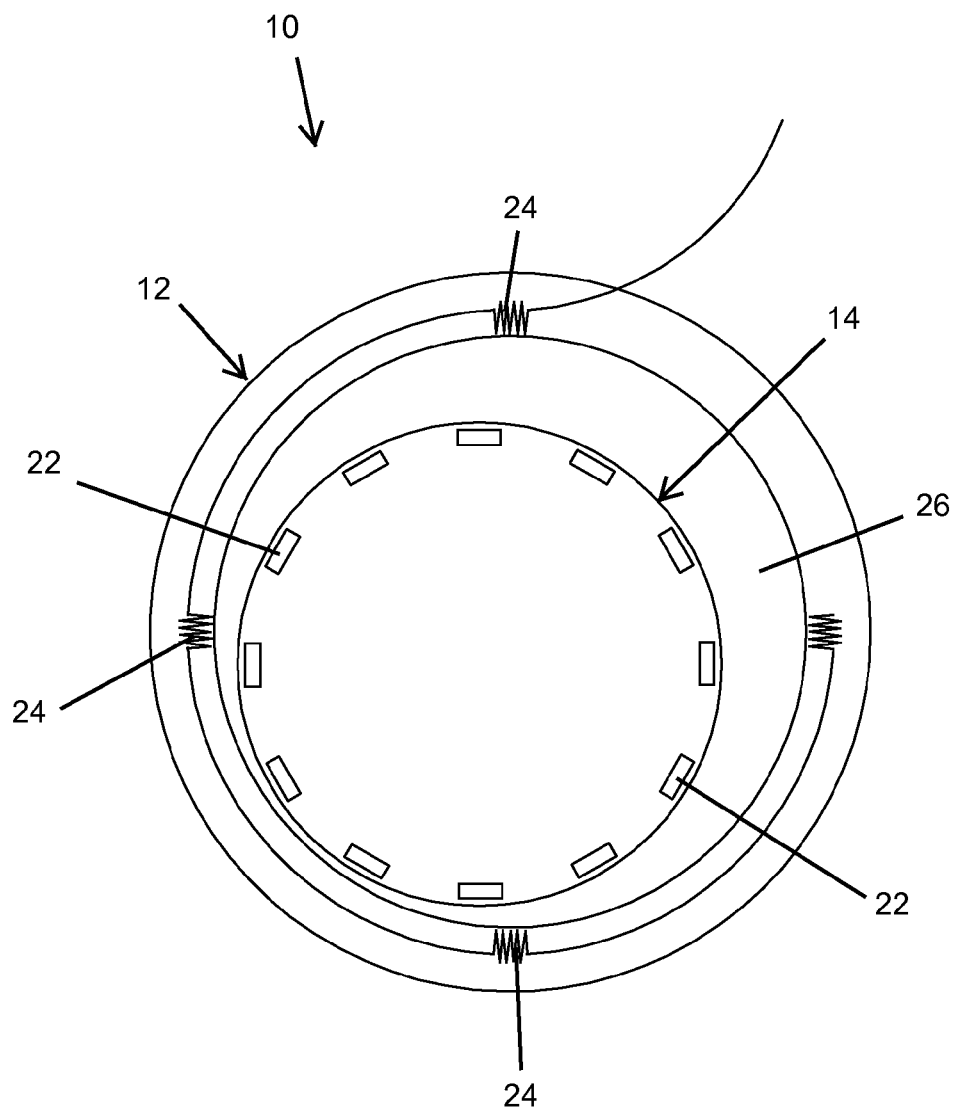
FIG. 2 illustrates a schematic representation of the turbine illustrated in FIG. 1, showing components forming part of a generator of the turbine.
Figure 3:
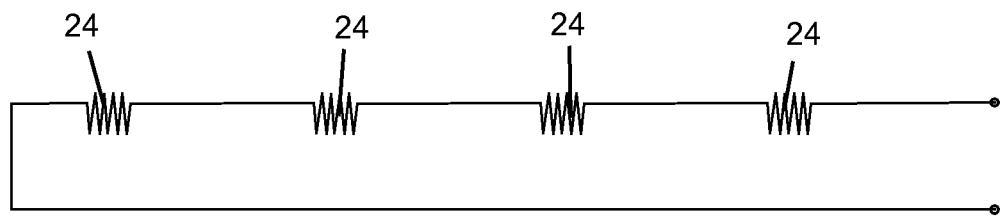
FIG. 3 illustrates a circuit diagram representation of the generator coils illustrated in FIG. 2.

However in the turbine 10 of the present invention the coils 24 are arranged in groups, only one of which is shown in FIG. 2, in which groups the coils 24 are electrically connected in series in order to evenly distribute the current around the perimeter of the machine and prevent overheating of any one of the coils 24. FIG. 3 shows a circuit diagram representation of one of these groups of coils 24. Although not illustrated the turbine 10 preferably comprises a number of such groups of coils 24.

Figure 5:
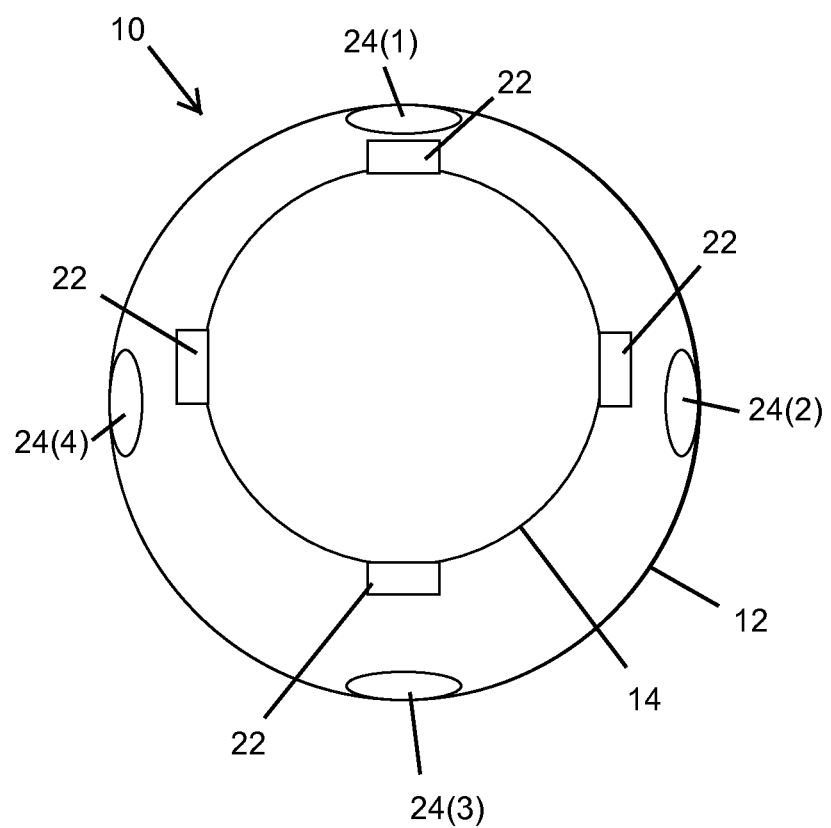
FIG. 5 illustrates a further schematic representation of the turbine illustrated in FIG. 1.

Referring to FIG. 5, the four coils 24 are connected in series. Eccentric rotation of the rotor of the form illustrated causes coil 24(1) to have a lower than average amplitude of voltage, coil 24(3) has higher than average amplitude, coil 24(4) has average amplitude but its phase is in advance of the average and coil 24(2) has average amplitude but phase retarded with respect to the average. When all four voltages are added by virtue of the series connection of the coils 24 then the deviations from average are almost completely cancelled.

A machine having thirty-six coils and forty-eight rotor magnet poles may comprise nine coil groups each with four coils connected in series. The first group, comprising the first, tenth, nineteenth and twenty-eighth coils, has voltages as illustrated in FIG. 4. The second group has voltages that are similar but shifted in phase by 120 electrical degrees. The third group is again similar with a further 120-degree phase shift. The fourth group, comprising the fourth, thirteenth, twenty-second and thirty-second coils, has EMFs similar to those of the first group. The individual EMFs differ slightly according to the effect of the rotor eccentricity but the total EMF remains almost completely unaffected by eccentricity. Similarly group seven has EMFs that sum to the same total but the individual EMFs also differ somewhat from those of group one. Groups one, four and seven may be connected in parallel and their total current will be divided evenly between the two. Likewise groups two, five and eight may be connected in parallel and groups three, six and nine may be connected in parallel. The thirty-six coils are thus connected to form a balanced three-phase output and, with balanced three-phase load, the power loss and heating are uniformly distributed around the perimeter of the generator. Within each group, the coils 24 are preferably equally spaced from one another about the circumference of the stator 12. This will ensure the most even distribution of current. Thus for example in the embodiment illustrated the group of coils 24 shown includes four coils evenly spaced at 90° to one another about the stator 12, although it will be appreciated that any other suitable number of coils may be employed.

For the invention to operate effectively there must be at least two coils 24 connected in series for each coil group and these should be disposed at substantially diametrically opposed positions and connected such that their EMF is summed when there is relative motion between the rotor and the stator. However, having two series coils at diametrically opposed positions for all the parallel coil groups means that the cables connecting series coils are very long as they are laid across half the circumference of the stator and for a turbine that has a large number of parallel coil groups, the cost of cable may be high and the additional electrical loss within the cables will adversely affect the efficiency of the generator.

It is preferable to connect more than two coils in series to shorten the cable length. For example each coil group may have three coils in series and they are spread out equally (at 120 degrees) around the inner circumference of the stator, four coils in series with the angle span between adjacent coils is 90 degrees, or five coils in series per group and the angle span between adjacent coils being 72 degrees.

Although the preferred embodiment provides a 3-phase electrical machine, it is relatively straightforward to extend the connections to other polyphase machines such as two, four, five, six, twelve or higher number of phases.

If a coil within a particular coil group within a particular phase fails for any reason this coil group and along with the corresponding coil groups in other phases will be disconnected or electrically isolated from the machine to keep the impedance of the phases the same and balanced.

The above arrangement thus reduces or eliminates the problem of uneven power generation when using a shaftless turbine 10. It thereby relieves the mechanical designer of the need to constrain the rotor motion to a tightly defined concentric and co-axial rotation and permits the rotor to move in an eccentric or hypocycloidal pattern and allows the rotor axis to move in a complex or random manner.

The invention claimed is:

1. A hydroelectric turbine comprising:
a stator;
a shaftless rotor housed for rotation within the stator for generating electricity by extracting power from the tidal flow of water through the turbine, the stator defining an opening within which the rotor is constrained, the opening being shaped and dimensioned, relative to the rotor, to provide the rotor with a floating axis of rotation arising in eccentric rotation of the rotor;
an array of magnets on the rotor; and
a corresponding array of coils on the stator which experience voltage unbalance arising from the eccentric rotation of the rotor; the coils being arranged in groups within which the coils are circumferentially equally spaced from one another and are electrically connected together in series in order to evenly distribute the current around the perimeter of the turbine to prevent overheating of any of the coils.

2. A hydroelectric turbine according to claim 1 in which coils electrically connected together in series are not physically adjacent one another on the stator.

3. A hydroelectric turbine according to claim 1 in which the rotor comprises an open center.

4. A hydroelectric turbine according to claim 1 in which the opening is shaped and dimensioned to permit the rotor to undergo substantially eccentric or hypocycloidal motion.

5. A hydroelectric turbine according to claim 1 in which the stator comprises an annular channel which defines the opening and within which the rotor in retained for rotation.

6. A hydroelectric turbine comprising:
a stator;
a shaftless rotor housed for rotation within the stator, for generating electricity by extracting power from the tidal flow of water through the turbine, the stator defining an opening within which the rotor is constrained, the opening being shaped and dimensioned, relative to the rotor, to provide the rotor with a floating axis of rotation arising in eccentric rotation of the rotor;
an array of magnets on the rotor; and
a corresponding array of coils on the stator which experience voltage unbalance arising from the eccentric rotation of the rotor, the coils being arranged in groups within which the coils are circumferentially equally spaced from one another, each coil being electrically connected in series to two adjacent coils in order to evenly distribute the current around the perimeter of the turbine to prevent overheating of any of the coils.

* * * * *